United States Patent [19]

Rilly

[11] Patent Number: 4,710,859

[45] Date of Patent: Dec. 1, 1987

[54] D.C. TO D.C. CONVERTER WITH A SWITCH-MODE POWER SUPPLY

[75] Inventor: Gerard Rilly, Unterkirnach, Fed. Rep. of Germany

[73] Assignee: Deutsche Thomson-Brandt GmbH, Villingen-Schwenningen, Fed. Rep. of Germany

[21] Appl. No.: 870,112

[22] Filed: Jun. 3, 1986

[30] Foreign Application Priority Data

Jun. 24, 1985 [EP]  European Pat. Off. ........ 85107828.7

[51] Int. Cl.$^4$ ............................................ H02M 3/335
[52] U.S. Cl. ........................................ 363/21; 363/97
[58] Field of Search .................. 363/20, 21, 50, 56, 363/75, 80, 97, 131

[56] References Cited

U.S. PATENT DOCUMENTS

| 4,328,537 | 5/1982 | Schmidtner et al. | 363/21 |
| 4,593,346 | 6/1986 | Nooijen et al. | 363/21 |

FOREIGN PATENT DOCUMENTS

| 0083533 | 7/1983 | European Pat. Off. . |
| 2486326 | 1/1982 | France . |
| 2502418 | 9/1982 | France . |

Primary Examiner—Patrick R. Salce
Assistant Examiner—Anita M. Ault
Attorney, Agent, or Firm—Spencer & Frank

[57]  ABSTRACT

DC-converter with a switch-mode power supply, in particular for continuously operating magnetrons of the type generally used in microwave ovens. By a special tuning of an oscillating circuit (16,18) forming the control voltage for the switching transistor (9) it is achieved that the switching transistor off-time as well as its duty cycle can be varied within large ranges.

18 Claims, 3 Drawing Figures

D.C. TO D.C. CONVERTER WITH A SWITCH-MODE POWER SUPPLY

The present invention relates to a high-voltage D.C. to D.C. converter or a switch-mode power supply, in particular for continuously operating magnetrons of the type generally used in microwave ovens. Such a power supply is a D.C. to D.C. converter, whose input is generally fed from a rectifier assembly (bridge) connected to the A.C. line voltage (mains, Netz) and which is capable of providing at its output thousands of volts D.C. and a current of several hundreds of milliamperes flowing into the load.

Switch-mode supplies using a high-voltage switching transistor and a power or supply transformer having a primary winding connected in series with the collector-to-emitter path of this transistor, between the terminals of a D.C. supply source, such as a line voltage rectifier, are well known in the art. In some of these, the base drive current for the switching transistor is obtained by means of an auxiliary current transformer whose primary winding is inserted between that of the power transformer and the collector-emitter path of the switching transistor and whose secondary winding is respectively connected across the base-emitter junction thereof. The turning off the switching transistor is controlled by turning on a controllable, unidirectionally conducting electronic switching element connected across the base-emitter junction of the switching transistor and/or the secondary winding of the current transformer.

In such circuits the switching transistor has a so-called forward time or on-time during which the transistor is conductive and a sawtooth like current is flowing through the primary winding of the transformer. Furthermore the transistor has a so-called flyback-time during which the transistor is made non-conductive and the current flowing through the primary winding is interrupted. This time is called the off-time of the transistor. Generally the off-time has a fixed value in known circuits which is determined especially by the inductance of the primary winding and the capacitance of a capacitor shunting the switching transistor.

In practice there are cases where it is desirably or necessary to vary the flyback or off-time or the duty cycle of the switching transistor, i.e. the ratio of its on-time to the repetition period of its operation—ton/(ton+toff). If for example the circuit at the secondary side of the transformer for deriving the operating voltage is of the flyback type the output voltage is usually controlled by varying the duty cycle of the switching transistor.

Generally the operating voltage at the secondary side of the transformer can be made by rectification of the voltage during the flyback time or the forward time. It is also possible and advantageous to use a combination of those methods, that means a rectification of both pulses during the forward time and the flyback time. In this way a higher operating voltage can be gained the amplitude of which corresponds to the peak to peak value of the pulse voltage at the secondary winding. Also in such cases the flyback time should be dependent from the load fed by said operating voltage.

On the other hand in a circuit as described it is difficult or impossible to vary the flyback or off-time of the switching transistor. In known circuits for example the control voltage for the switching transistor is gained by a resonance circuit including the secondary winding of a current transformer the primary winding of which is connected in series with the switching transistor. The resonance circuit forms the voltage defining the off-time of the switching transistor. For varying said off-time the capacitor of said resonance circuit should be varied. This, however, is difficult or impossible.

It is, therefore, an object of the invention to provide a circuit which tolerates relatively important variations of the switching transistor off-time, as well as those of its duty cycle i.e. ton/(ton+tqff), which may vary between about $\frac{1}{3}$ and 4/5.

The invention relates to a D.C. to D.C. converter with a switchmode power supply including a switching transistor having its collector-to-emitter path connected in series with the respective primary windings of a current and a power transformer, across the terminals of a first D.C. power supply, a commutating capacitor connected between the emitter of said transistor and the junction of said primary windings, a basedrive circuit including the secondary winding of said current transformer and coupled to the base of said transistor and a tuning capacitor shunting said current transformer secondary winding for forming with the inductance thereof a parallel resonant or oscillating circuit.

According to the invention the resonant half-period of said parallel resonant or oscillating circuit is shorter than that of the power transformer primary winding inductance with the capacitance of the commutating capacitor.

With the invention the pulse generated by the secondary winding of the current transformer is made, by special tuning of the resonant circuit, so short that it is shorter than the shortest desired off-time of the switching transistor. Therefore the actual flyback or off-time of the switching transistor can be defined independantly from said secondary winding by other means and may be varied within wide ranges without being influenced by the voltage of said secondary winding. Because of the tuning of the oscillating circuit to a higher frequency and the short duration of the pulse of the secondary winding the amplitude of said pulse will arise. As said secondary winding is connected to the base of the switching transistor it can happen that the base/emitter-path of said transistor influence said winding during flyback and may limit the amplitude of said short pulse, so that this pulse cannot arise.

Therefore, according to an embodiment of the invention a separator diode is inserted between the first terminal of said current transformer secondary winding and the base of said switching transistor. Said diode disconnects said secondary winding from the switching transistor during flyback so that said short impulse at the secondary winding can arise independent from the base/emitter-path of the switching transistor and cannot be limited in amplitude thereby.

According to a further embodiment of the invention a unidirectionally conducting electronic control switch is provided having an input or control electrode and two output electrodes relatively coupled to the base and the emitter of said switching transistor. This control switch, especially a MOS field effect transistor determines the flyback time or off-time of the switching transistor. The control voltage for said switch is preferably derived from the output of the switching transistor. In this way it is achieved that the switching transistor is turned on if the collector voltage of the switching transistor is zero or about zero.

Very important and advantageous is the combination of the inventive features described above. By this solution the two functions, i.e. the forward time or on-time of the switching transistor on the one hand and the flyback time or off-time of the switching transistor on the other hand are clearly separated. The on-time of the switching transistor is controlled by the secondary winding of said current transformer using the magnetic energy stored within said transformer. The secondary winding delivers the base current for the switching transistor during the on-time of said transistor. During said on-time the electronic control switch is inactive and has no influence upon the conduction of the switching transistor. During flyback time the secondary winding of said current transformer is separated from the base of the switching transistor by means of said separator diode so that the secondary winding has no influence upon the switching transistor during this time. Therefore this off-time can be defined only by said electronic control switch which preferably is controlled by the output voltage of the converter via a special control circuit.

The invention will be better understood and others of its features and advantages will become apparent from the following description with reference to the accompanying drawing, given solely by way of example, wherein.

Figure 1:
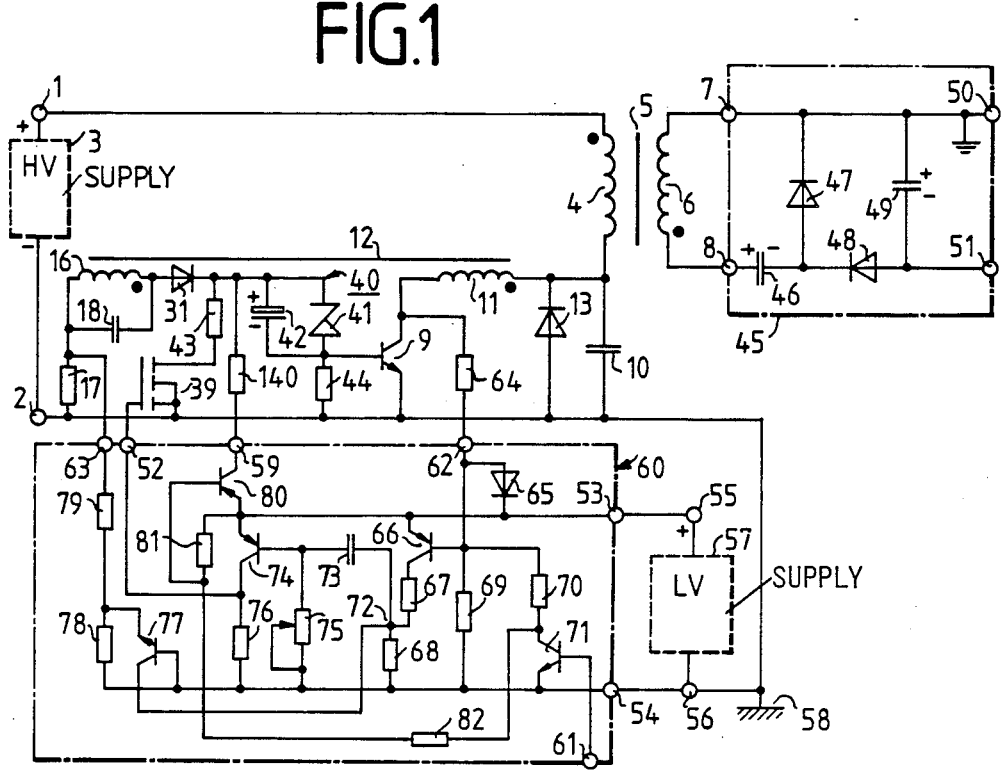
FIG. 1 is a schematic diagram of the preferred embodiment of a high voltage d.c. to d.c. converter and of its control circuit, according to the invention.

FIG. 1 shows a schematic diagram of a high-voltage switch-mode power supply according to the invention, including a simple control circuit of the monostable multivibrator-type. The circuit of FIG. 1 comprises a power transformer 5, a current or feedback transformer 12 for the base drive current, a bipolar junction power switching transistor 9 of the NPN type and a first or base biasing resistor 140. It moreover includes a recovery diode 13, a shunt capacitor 10 connected across it, a second or current measuring resistor 17 connected in series with the current transformer secondary winding 16 and a tuning capacitor 18 shunting the latter and a bias voltage source 40, as well as a separator diode 31 disconnecting this secondary winding 16 from the base of switching transistor 9 when its collector current ceases to flow and a control transistor 39, here of the MOSFET-type, which initiates the turn-off of the switching transistor 9.

A power-switching metal-oxide-semiconductor (MOS) field-effect transistor (FET) 39 is used here in preference to a bipolar junction switching transistor because of the power needed for driving the latter into saturation and of the storage time delaying its turn-off. As a matter of fact, the bipolar junction transistor's base drive current has to be proportional to its peak collector current, which includes the reverse base current induced into the current transformer secondary winding 16 by the collector current during the storage time of the switching transistor 9. This represents a relatively high power to be supplied to the control transistor base during the off time of the switching transistor 9, which has to be supplied by an additional driving stage. This is avoided here by using a power MOSFET 39 of the N-channel, normally off, enhancement-mode type, which presents no delay of its turn-off due to storage-time and needs only a sufficient gate-voltage swing with very little current and consequently substantially no power, to be driven into conduction. It is for example sufficient to provide it with a gate-to-source bias of about the double of the threshold value $V_{GS(th)}$ of 3 volts to turn it on. Such a MOSFET is moreover better adapted to conduct the abovementioned short high-current pulse during the storage time of the switching transistor 9 preceding its turn-off.

The MOSFET control transistor 39 is connected here to the cathode of the separator diode 31, to the cathode of a Zener diode 41 and the positive terminal of an electrolytic capacitor 42, whose negative terminal is connected to the anode of the Zener diode 41 and to the base of the switching transistor 9, whereby the Zener voltage to which the capacitor 42 is charged by the base drive current of the transistor 9, while it is turned on, becomes its reverse base bias voltage, when the control transistor 39 is turned on. A small current limiting resistor 43 (about 0.5 ohms) may be inserted between the drain of the MOSFET 39 and the junction of the diode 31 and of the voltage source 40, if its drain-to-source on resistance $R_{DS(on)}$ is insufficient. The base of the switching transistor 9 is further connected to its emitter by means of a third or base resistor 44 (of about a kiloohm).

The output terminals 7 and 8 of the power transformer secondary winding 6 are respectively connected to two input terminals of a peak-to-peak rectifier 45. This rectifier includes a first filtering capacitor 46 having one terminal connected to the first secondary winding output terminal 8 and its other terminal connected to the anode of a first rectifier diode 47 and to the cathode of a second rectifier diode 48. The cathode of the first rectifier diode 47 is connected to the second secondary winding output terminal 7, to one terminal of a second filtering capacitor 49 and to the positive rectifier output terminal 50, which is grounded (which is to be connected to the anode of the magnetron—not shown). The anode of the second rectifier diode 48 and the other terminal of the second capacitor 49 are connected together to the negative rectifier output terminal 51 (which is to be connected to the cathode of the magnetron). The first diode 47, which can be called the forward diode, is conducting during the on-time of the switching transistor 9, to charge the first capacitor 46 to a voltage proportional to the supply voltage $V_1$. The second diode 48, which may be called the flyback one, conducts during the off time of both the transistor 9 and the shunt diode 13, and discharges the first capacitor 46 and charges the second capacitor 49 in series to a voltage proportional to the peak-to-peak value $V_{pp}$ of the collector-to-emitter voltage $V_{CE9}$ of the switching transistor 9. The proportionality is determined by the secondary to primary turn ratio N6/N4.

The control MOSFET 39 is controlled by means of a recurrent rectangular voltage waveform supplied to its gate from the output 52 of a control circuit 60, which has positive 53 and negative 54 supply inputs respectively connected to the positive 55 and negative 56 terminals a low-voltage d.c. supply source 57. The respective negative terminals 2 and 56 of the high-voltage 3 and low-voltage 57 supplies are connected together to a common ground 58. The positive terminal 55 of the low-voltage supply 57 is also connected, through input 53 and output 59, to the first or starting resistor 140, to provide the base of the switching transistor 9 with a positive bias, when the control MOSFET 39 has been turned off, so as to initate the conduction of the former.

This starting resistor 140 can also be connected to the positive terminal 1 of the high-voltage supply 3.

However, for reasons that will be explained further on, it is possible and advantageous to insert a PNP-type bipolar junction transistor 80 between the positive supply input 53 and the biasing output 59 of the control circuit 60, to avoid eventual spurious startings of the converter, when the high 3 and low-voltage 57 supplies are being switched on. This transistor 80 prevents the application of a forward bias to the switching transistor 9 before it is desired.

The control circuit 60 further comprises a starting input 61, a retriggering input 62 and current-limiting input 63, the first of which (61) is to receive a positive-going, externally generated single-shot starting pulse, when it is desired to put the converter power supply into operation. The retriggering input 62 is connected to the collector of the switching transistor 9 by means of a fourth resistor 64, to the positive supply input 53 by means of a clamping diode 65 and to the base of a second bipolar junction transistor 66 of the PNP type.

The second transistor 66 has its emitter connected to the positive supply input 53, and its collector is connected by a fifth and sixth resistor 67 and 68 in series, to the negative supply input 54, which is also connected to its base trough a seventh resistor 69. This base is further connected through an eighth resistor 70 to the collector of a third bipolar junction transistor 71 of the NPN type, whose emitter is connected to the negative supply input 54 and whose base is connected to the starting input 61. The junction point 72 of the two series resistors 67 and 68 in the collector circuit of the second transistor 66 is connected to one terminal of a coupling capacitor 73, whose other terminal is connected to the base of a fourth bipolar junction transistor 74 of the PNP type and to the negative supply input 54 through a variable resistor 75. The emitter of the fourth transistor 74 is connected to the positive supply input 53 and its collector is connected, on the one hand through a tenth resistor 76, to the negative supply input 54 and on the other hand, to the control circuit output 52, which is connected to the gate of the control MOSFET 39.

To provide a limiting of the peak collector current of the switching transistor 9 whereby to protect it from destruction or damage, the junction point 72 of the two series resistors 67 and 68 is further connected to the collector of a fifth bipolar junction transistor 77 of the NPN type, whose base is connected to the negative supply terminal 54. The emitter of the fifth transistor 77 is connected, on the one hand, by means of an eleventh resistor 78 to the negative supply terminal 54 and on the other hand, by means of a twelfth resistor 79 to the current-limiting input 63 of the control circuit 60, which is connected to the junction of the second or measuring resistor 17 with the current transformer secondary winding 16 and its shunt tuning capacitor 18.

As will be explained further on, the base-drive circuit according to the invention, shown in FIG. 1, is capable of supplying during its normal, recurrent operation, a base-drive current of sufficient magnitude from the current transformer secondary winding 16 to turn the switching transistor 9 on without the base being permanently connected through the starting resistor 140 to the positive terminal of one of the D.C. supply sources 3 or 57. It is therefore advantageous and even preferable to insert a sixth bipolar junction transistor 80 of the PNP type, between the positive supply input 53 and the output 59 of the control circuit 60, which is connected to one of the terminals of the first of starting resistor 140, whose other terminal is connected to the cathode of the separator diode 31, to the drain of the MOSFET 39 and to the positive terminal of the reverse bias source 40. The emitter of this sixth transistor 80 is connected to the positive supply input 53, its collector to the output 59 and its base is connected through a thirteenth resistor 81 to the junction of the input 53 and of its emitter, to keep it normally turned off. The base of the sixth transistor 80 is further connected through a fourteenth resistor 82 to the collector of the third or starting transistor 71 (NPN), whereby to turn the sixth transistor 80 on, when the third one 71 is turned on by a starting pulse applied to its base from input 61. As the collector of the third transistor 71 is also connected through the eighth resistor 70 to the base of the second transistor 66, whose voltage varies between $V_{55}+V_{FD}$ and $V_{55}/V_{FD}$, care has to be taken in choosing the values of resistors 81 and 82, which form a resistive voltage divider, to prevent the recurrent turning on of the sixth transistor 80. The values of the resistors 81 and 82 can be chosen substantially equal and both equal or smaller than that of the eighth resistor 71. In other words, the value of the resistor 81 has to be equal or less than a third of the sum of the values of the resistors 70, 82 and 81. The actual role of this additional circuit 80-82 is to apply a forward bias to the base of switching transistor 9 through the starting resistor 140 only while starting the operation of the converter, i.e. before it has reached its normal, steady-state operation and to prevent its self-starting or spurious starting of any kind without a starting pulse at input 61.

The circuit of FIG. 1 having been described hereinabove, its operation will be described below, with reference to FIG. 2, which shows waveform diagrams at different points of this circuit.

When both the low 57 and high voltage 3 supplies are switched on simultaneously and reach their nominal voltages (12 $V_{DC}$ and 300 $V_{DC}$ approximately) at approximately the same time, the first or switching transistor 9 will remain cut-off, because the initial conduction of both the fourth transistor 74 and the control MOSFET 39 driven by it, keeps the junction of the respective cathodes of the separator diode 31 and of the Zener diode 41, close to ground potential. This allows the build up of a positive high d.c. voltage equal to the H.V. supply voltage $V_1$ at the collector of the switching transistor 9, which is transmitted through the fourth resistor 64 and the seventh resistor 69 connected in series, to the base of the second transistor 66. The diode 65 connected to the junction of these resistors 64 and 69 allows to clamp the reverse emitter-to-base voltage of the second transistor 66 to the diode forward voltage drop $V_{FD}$ of about 0.7 volts, which is more than sufficient to keep it turned off, even if the first or starting resistor 140 is directly connected to the positive terminal of one of the D.C. supplies 3 or 57.

When a positive-going starting pulse is applied to the input 61 of the control circuit 60, the third transistor 71 is turned on and pulls the base of the second transistor 66 down through resistor 70 sufficiently to turn it on too. Simultaneously, the base of the sixth transistor 80 is pulled down through resistor 82 to turn it on in such a way as to connect the base of the switching transistor 9, to the positive supply input 53, through the starting resistor 140, the uncharged reverse bias voltage source 40 and the resistor 44 shunting the switching transistor base-emitter junction, connected in series. After the second transistor 66 has been turned on, its collector current flows through the series connected resistors 67 and 68 so that the voltage at their junction 72 will rise to about $V_{55}.R_{68}/(R_{67}+R_{68})$, where $V_{55}$ is the output voltage of the L.V. supply 57. This steep voltage rise is transmitted through the coupling capacitor 73 to the base of the fourth transistor 74, which has received its base voltage through variable resistor 75 so that it was biased to $V_{B74}=V_{55}-V_{FD}$ and was previously conducting. The positive voltage step $V_{72}$ added to this bias voltage turns the fourth transistor 74 off, so that its collector voltage falls to zero. This results in the turn-off of the control MOSFET 39.

With the control MOSFET 39 off and the sixth transistor 80 on, the capacitor 42 of the reverse bias source 40 gets charged through resistors 140 and 44 in series, until it reaches the Zener breakdown voltage to the Zener diode 41 shunting it. Thereafter, the starting current flows through the Zener diode 41 and the base-emitter junction of the switching transistor 9, which becomes turned on to make almost the entire H.V. supply voltage V1 appear across the primary winding 4 of the power transformer 5. In response thereto, a corresponding voltage $V_{78}=V_1.N6/N4$ appears across the terminals 7 and 8 of the power transformer secondary winding 6 which will turn on the first rectifier diode 47 and charge the first filtering capacitor 46 in an oscillatory manner, the resonant frequency being determined by the leakage inductance of the secondary winding 6 and capacitance $C_{46}$. The capacitor 46 being initialy totally discharged and the leakage inductance being relatively small, the collector current of the switching transistor 9 will rise very steeply like if its collector load were purely capacitive. This steep current rise is transmitted to the current transformer secondary winding 16 and a similarly-shaped base-drive current will flow from ground, through the measuring resistor 17, the diode 31 and the voltage source 40 in series, into the switching transistor base-emitter junction. The voltage drop across the measuring resistor 17 will turn on the fifth transistor 77, whose collector current will cause a fall of the voltage $V_{72}$ at the junction of the resistors 67 and 68, which is transmitted by the coupling capacitor 73. The fourth transistor 74 gets turned on by this negative-going voltage transistion well before the coupling capacitor 73 would have normally been discharged through variable resistor 75. The turn-on of the fourth transistor 74 makes the control MOSFET 39, whose gate is connected to its collector, turn on too, thus initiating the turn-off of the switching transistor 9. When this turn-off has occurred, the collector voltage therof rises in an oscillatory manner as the capacitor 10 gets charged through the inductance of the primary winding 4 of the power transformer 5 to less than the double of the H.V. supply voltage $V_1$. Then the voltage induced thereby across the terminals of the power transformer secondary winding 6 charges, through the second rectifier diode 48, the second capacitor 49 and discharges the first one 46 partly. After reaching its peak value, the collector voltage proceeds in its oscillation. Due to the modification of the voltage division ratio during the conduction of starting transistor 71, both the second 66 and the first transistor 9 are turned on almost simultaneously, when the colllector voltage of the latter has fallen to a positive level of predetermined magnitude, thus avoiding the conduction of the shunt diode 13. The fast rise of the switching transistor collector current, its cut-off initiated by the current-limiting circuit 77–79 and the following oscillatory variation of the collector voltage will be cyclically repeated until the amplitude of the oscillatory current through the first diode 47 will decrease sufficiently to keep the current-limiting transistor 77 turned off, which means that both capacitors 46 and 49 of the peak-to-peak rectifier 45 are sufficiently charged and that the time constant R75.C73 of the differentiating circuit 73, 75 will become the determining factor of the duration of the on time of the switching transistor 9. From then on, the normal, steady-state, recurrent operation of the converter will become established.

This normal operation of the circuit of FIG. 1 will be explained hereinafter, with reference to FIG. 2 of the drawing.

Figure 2A:
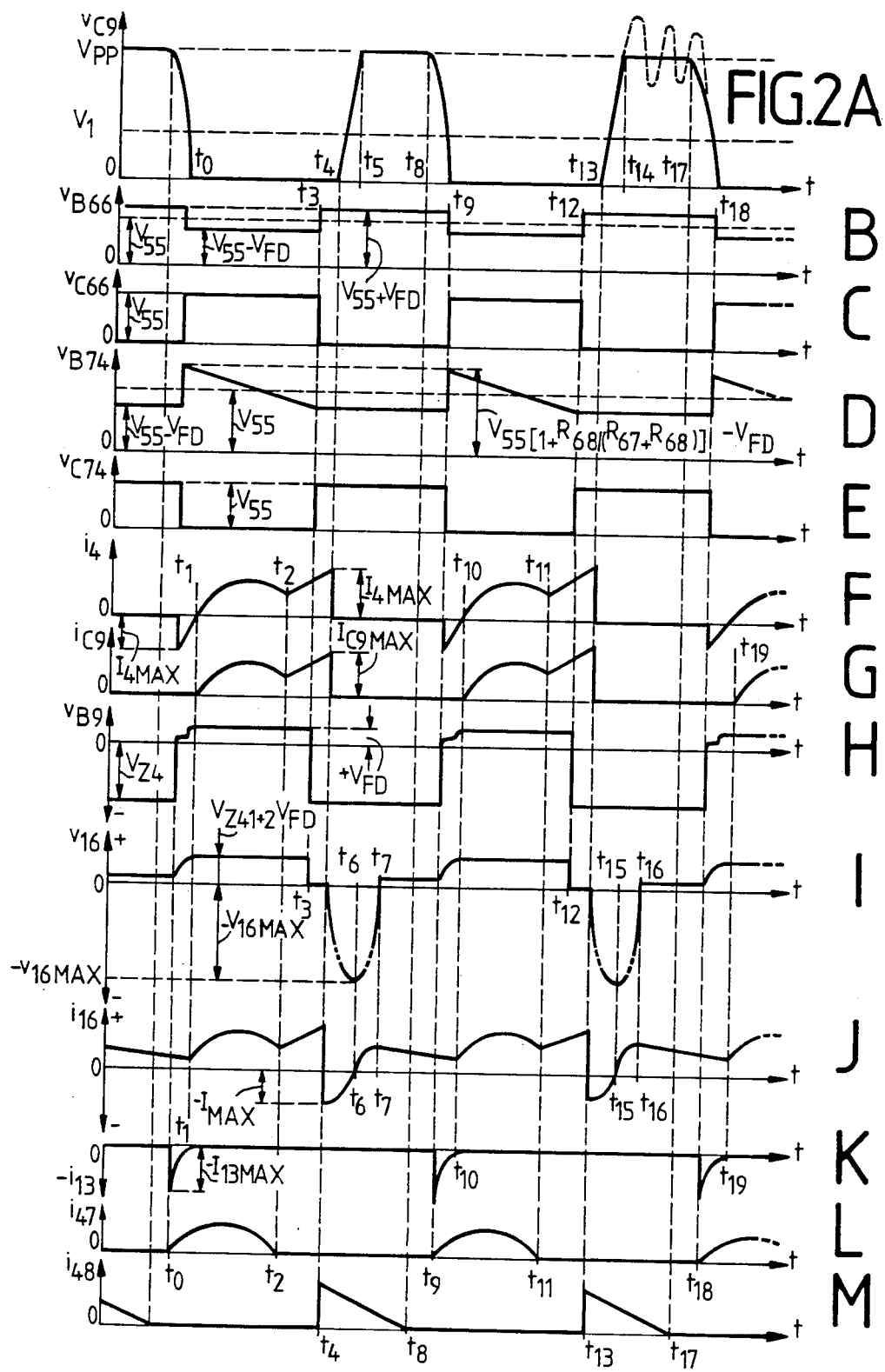
FIG. 2 shows different voltage and current waveforms at different points of the circuit of FIG. 1.

As concerns FIG. 2, diagram A shows the switching transistor collector voltage waveform $v_{C9}(t)$, diagram B shows the base voltage waveform $v_{B66}(t)$ of the PNP switching transistor 66, diagram C shows the collector voltage waveform $v_{C66}(t)$ of the PNP transistor 66, diagram D shows the base voltage waveform $v_{B74}(t)$ of the PNP transistor 74, diagram E shows the collector voltage waveform $v_{C74}(t)$ of the latter, which is also the gate voltage $v_{G39}(t)$ of the control MOSFET 39, diagram F shows the waveform of the current $i_4(t)$ flowing through the power transformer primary winding 4, diagram G shows the switching transistor collector current waveform $i_{C9}(t)$, diagram H shows the switching transistor base voltage waveform $V_{B9}(t)$, diagram I shows the voltage waveform $v_{16}(t)$ across the current transformer secondary winding 16 and its shunt tuning capacitor 18, diagram J shows the current trasformer secondary winding current waveform $i_{16}(t)$, diagram K shows the shunt diode 13 current waveform $iv_{13}(t)$, diagram L shows the first rectifier diode 47 current waveform $i_{47}(t)$ and diagram M shows the second rectifier diode 48 current waveform $i_{48}(t)$.

When, at the instant $t_0$, the switching transistor collector voltage $v_{C9}$, shown in diagram A, falls below the voltage $V_{55}$ delivered by the low-voltage supply 57, the clamping diode 65 becomes turned off and allows the resistor 69 to pull down the second transistor's base voltage $V_{B66}$ sufficiently to turn it on, as shown in diagram B. Thus, the collector voltage $v_{C66}$ of the second transistor (PNP) 66, shown in diagram C, rises abruptly to almost the L.V. supply voltage $V_{55}$ and the voltage $v_{72}$ at the junction 72 of the resistive voltage divider 67–68 in its collector circuit, will rise to $V_{55}.R_{68}/(R_{67}+R_{68})$. This almost instantaneous voltage increment is transmitted through coupling capacitor 73 to the base of fourth transistor 74 (PNP) and added to its initial base voltage $V_{B74}=V_{55}-V_{FD}$ so that, at the instant $t_0$, it will become equal to $v_{B74}(t_o)=V_{55}(1+R_{68}/(R_{67}+R_{68})-V_{FD}$, which turns the fourth transistor 74 (PNP) off. This makes its collector voltage $v_{C74}$, shown diagram D, drop to zero and cuts the control MOSFET 39 off as well. At the same time, the current which flowed from the current transformer secondary winding 16, as will be explained later on, through diode 31, resistor 43 and the MOSFET 39 in series, into ground, is taken over by the capacitor 42 shunting the Zener diode 41 and the resistor 44 shunting the base-emitter junction of the first transistor 9 (NPN). When the capacitor 42 is charged to the Zener breakdown voltage (3 volts) of the diode 42, the latter starts conducting a reverse current which flows into the base of transistor 9 to allow its turn-on. Its base voltage $V_{B9}$ is shown in diagram H and its collector current $i_{C9}$ in diagram G of FIG. 2. When the switching transistor collector voltage $V_{C9}$ of diagram A drops below zero value, the shunt diode 13 is turned on and its current $i_{13}$ shown in diagram K, starts to flow at $t_o$. This keeps the clamping diode 65 reverse biased and the second transistor 66 conducting by maintaining its base forward biased, as shown in diagrams B and C of FIG. 2. The shunt recovery diode 13 conducts from $t_0$ onwards a current gradually increasing from its negative peak value towards zero and ceases at instant $t_1$.

When diode 13 is turned on at $t_0$, the entire H.V. supply voltage $V_1$ is applied across the primary winding 4 of the power transformer 5 and consequently an oppositely poled voltage appears across the terminals 7 and 8 of its secondary winding 6. At the instant $t_0$, this secondary voltage $V_{78}$ is equal to the product of the H.V. supply voltage $V_1$ and the secondary to primary turns ratio N6/N4, i.e. $v_{78}(t_0) = -V_1 \cdot N6/N4$, and appears across the first recitfier diode 47 and the first filtering capacitor 46 in series. This voltage has just the correct polarity to make the first diode 47 conduct from $t_0$ onwards until the first capacitor 46 is charged to $v_{78}(t_0)$ less the diode forward voltage drop $V_{FD}$. This charging current flowing though the first diode 47 is of substantially sinusoidal shape and is shown in diagram L of FIG. 2. This sine shape of the secondary current is reflected through the core of power transformer 5 to the primary winding 4, which will carry a current $i_4$, shown in diagram F, which will have a sine wave superposed on a sawtooth wave, the latter being due to its leakage inductance, during the conduction period of the first diode 47. This diode 47, which conducts during the on times of the diode 13 and of the transistor 9, may also be called a "forward" diode.

When at the instant $t_1$ the diode 13 has ceased to conduct, the current from the current transformer secondary winding 16, through diode 31, and resistors 44 and 17 in series, has charged the capacitor 41 of the reverse bias voltage source 40 sufficiently to provide an initial base current to the switching transistor 9, so that it can be turned on to take over the current flowing through the power transformer primary winding 4 and through the current transformer primary winding 11 in series, so as to induce into the secondary winding 16 of the latter, a current $i_{16}$ shown in diagram J, which is used for driving the base of transistor 9.

When the first capacitor 46 is charged to $v_{78}(t_0) - V_{FD}$, which happens at the instant $t_2$, the diode 47 is cut off and the primary winding 4 ceases to be capacitively loaded and starts to behave as an almost purely inductive load. Thus current $i_4$ and the switching transistor collector current $i_{C9}$, respectively shown in diagrams F and G, become linearly increasing currents from $t_2$ onwards, like in a flyback-type switched-mode supply, where the energy stored in the core during the on time is transferred during the off time to the load, through a rectifier and filtering capacitor assembly.

The coupling capacitor 73 which has brought the base of the fourth transistor 74 to cut-off at the instant $t_0$, forms an RC differentiating circuit with the variable resistor 75 and is exponentially discharged through the latter with a time constant $T_C$ substantially equal to $R_{75} \cdot C_{73}$. As resistor 75 being connected between the base of transistor 74 and ground, the decrease of the transistor base voltage $V_{74}$ is substantially linear until, at instant $t_3$, it reaches the turn on voltage $V_{55} - V_{FD}$. This is shown in diagram D of FIG. 2. The slope of this decrease is adjustable by the variation of the value of the resistor 75, which thus allows to adjust the on time of the switching transistor 9 and consequently the power supplied to the load.

When transistor 74 is turned on at $t_3$, its collector voltage $v_{C74}$ shown in diagram E, goes high again and turns the control MOSFET 39 on. This connects the positive terminal of the bias voltage source 40 substantially to ground and the switching transistor base voltage $v_{B9}$, shown in diagram H, becomes negative to shorten the storage time, during which the excess minority charge carriers are evacuated from the base. When, at the instant $t_4$, the storage time has elapsed, the current flowing through the respective primary windings 4 and 11 of the power 5 and current 12 transformers and through the collector-emitter path of transistor 9, is cut off abruptly.

The current induced in the secondary winding 16 of the current transformer 12 during the interval between instants $t_3$ and $t_4$, i.e. during the storage time $T_S$, flows through diode 31, resistor 43, MOSFET 39 and resistor 17 in series, which then load this winding 16. This current $i_{16}(t)$ is shown in diagram J of FIG. 2, to continue its linear rise between $t_3$ and $t_4$ to reach its peak value at $t_4$, when $i_{16}(t_4)$ is $I_{16MAX}$. When, at the instant $t_4$, the collector current $i_{C9}$ of diagram G and the primary current $i_4$ cease simultaneously, the voltages across the terminals of the respective primary 4, 11 and secondary windings 6 and 16 of the power 5 and current 12 transformers undergo an instantaneous reversal of their polarities. This voltage reversal across the secondary winding 16 of the current transformer 12 will reverse bias the separator diode 31 and leaves it connected only to its shunt tuning capacitor 18, wherewith it forms a parallel resonant or oscillating circuit.

To evaluate the current $i_{16}$ through the current transformer secondary winding 16 at the instant $t_4$, when the switching transistor 9 has been turned off, the easiest way is to consider the equivalent circuit of the current transformer 12 including an ideal transformer with the leakage inductance of the primary winding 11 and the magnetizing inductance transferred to the secondary side. The magnetizing inductance connected in series with the transferred primary leakage inductance across te ideal transformer secondary winding draws a slowly and linearly decreasing inductive current, flowing in the opposite direction relatively to the current induced into the secondary winding of the ideal transformer by the switching transistor collector current $i_{C9}$ flowing through its primary winding. This magnetizing or inductive current varies slowly, i.e. with a mild slope, because the magnetizing inductance is large, and it has no mean value or direct current component. Thus, when at the instant $t_4$ the switching transistor ceases to conduct, the negative magnetizing current $-I_{mag}$, shown in diagram J of FIG. 2, corresponds to the energy stored in the secondary winding inductance $L_{16}$ and will begin to flow resonantly through the capacitor 18 shunting it. This resonance of the oscillating circuit 16-18 causes a negative-going sine-shaped half-wave of the voltage $v_{16}$ of diagram I to start at $t_4$, to reach its negative peak value of several tens of volts at $t_6$ and to return to a slightly positive level at $t_7$. At the same time, the current $i_{16}$ through the secondary winding 16 grows from $-I_{max}$ towards zero, which it reaches a $t_6$, and from then on to a positive value of about $+I_{max}$, at the instant $t_7$. The current waveform during this resonant half-period is of a cosine shape. As shown in diagram J, the resonant reversal of the sense of the magnetizing current at the instant $t_6$, due to the presence of the shunt capacitor 18, allows the energy stored in the current transformer 12 to be used for applying a forward bias to the base of the switching transistor 9 after the MOSFET 39 has been turned off, instead of the permanent connection of the starting resistor 140 to one of the positive supply terminals 1 or 55. When the voltage across the oscillating circuit 16-18 has become positive at $t_7$, the separator diode 31 will become forward biases again and the magnetizing current from the secondary winding 16 will flow through it and the control MOSFET 39 and the measuring resistor 17 in series, in a linearly decreasing manner until the MOSFET 39 has been turned off at $t_9$.

The peak negative voltage $-V_{16MAX}$ across the secondary winding 16, shown in diagram I, depends on the parallel resonant frequency of the oscillating circuit 16-18. The higher this frequency, i.e. the shorter the period, the higher the peak voltage. Due to the presence of the separator diode 31, the limitation of this peak voltage to the reverse avalanche breakdown voltage of the base-emitter junction of the switching transistor 9 reduced by the reverse bias voltage $-V_{Z41}$ provided by the source 40, has no longer to be taken into account. The circuit according to the invention, shown in FIG. 1, thus allows notable variations of the off time of switching transistor 9, which are due in particular to the nonlinear nature of the magnetron and will be explained further on. It is however preferable to keep the negative peak voltage $-V_{16MAX}$ above the reverse breakdown voltage of the separator diode 31, but this represents no real limitation as switching diodes having rated peak reverse voltages VRM of about 200 volts are available (for example, of the BAX 17 type).

As will be explained further on, the shortest off time of the switching transistor 9 will happen when the output of the rectifier assembly 45 draws no current, i.e. when it is unloaded. This off time is determined by the resonance of the inductance $L_4$ of the power transformer primary winding 4 with the capacitor 10. This puts a lower limit to the choice of the resonant frequency of the oscillating circuit including the current transformer secondary winding inductance $L_{16}$ and its shunt capacitance $C_{18}$.

The waveform of the collector voltage $v_{C9}$ during the switching transistor off time depends on the nature of the load. The behavior of a continuous-wave magnetron as the load of a switch-mode power supply of FIG. 1, will be considered hereinafter with reference to FIG. 3 of the drawings.

Figure 3:
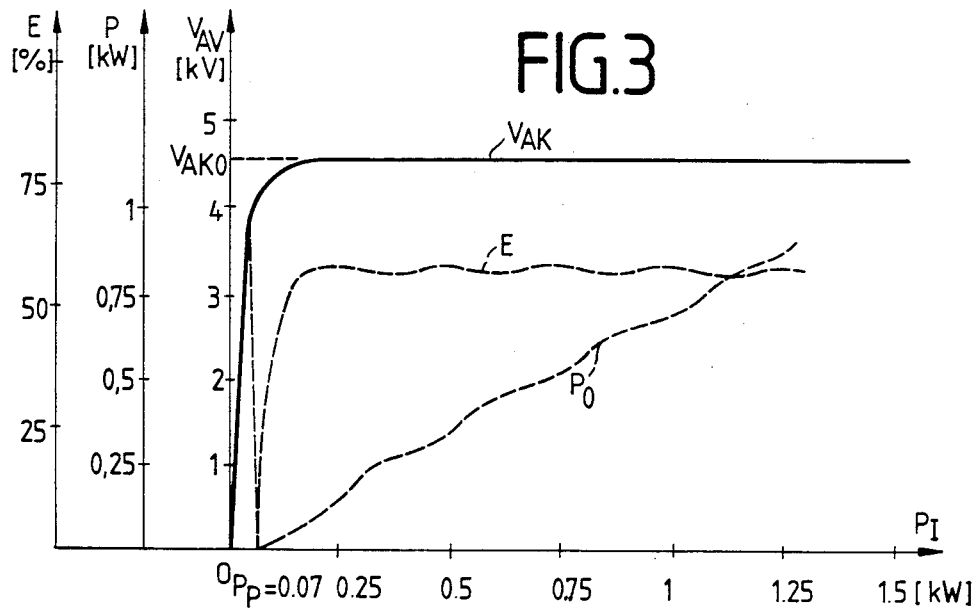
FIG. 3 is a diagram illustrating the performance characteristics of a continuous-wave magnetron.

FIG. 3 is a diagram showing the performance characteristics of a continuous-wave magnetron, i.e. the variation of the power output (curve $P_o$), the anode-to-cathode voltage (curve $V_{AK}$) and the efficiency (curve E) of such a device as a function of its power input $P_I = V_S \cdot I_S$, where $V_S$ is the supply voltage and $I_S$ is the current drawn from the power supply. The curve $V_{AK}$ is represented by a continuous line, the curve $P_o$ by a dashed line and the curve E by a dotted line.

The anode-to-cathode voltage $V_{AK}$ rises substantially linearly along a steep slope with the increase of the input power $P_I$ up to about 50–70 watts, up to which the efficiency E and the output power $P_o$ are both nil. This means that all the power supplied has generated no anode current in the magnetron, which remains cut off and that all the input power $P_I$ is dissipated in the power supply itself. The $V_{AK}$ voltage curve shows a knee at about $P_I = P_P = 60$ watts and $V_{AK} = 4$ kV and from then on varies little with the increasing $P_I$. At this voltage, the electric field has overcome the magnetic field which is oriented normally (orthogonally) to the former, and an anode current starts to flow into the magnetron. The efficiency E rises fast to reach about 70% for an input power $P_I = 200$ W and an anode-to-cathode voltage $V_{AK}$ of about 4.5 kV. The output power $P_O$ increases substantially proportionally to the input power $P_I$ above $P_I = 0.2$ kW, as the efficiency fluctuates only slightly about its peak value of 70%.

From these curves, it can easily be seen that the magnetron after starting remains at a substantially constant voltage, in a way similar to that of a voltage regulator diode and will draw an anode current which will increase with the d.c. power input so as to increase its microwave power output. Thus the behaviour of the magnetron in the load circuit of the converter will be similar to that of a voltage regulator diode (Zener or avalanche).

Referring back to FIG. 2, it can be seen from diagram A, that when the collector $i_{C9}$ (diagram G) and power transformer primary current $i_4$ (diagram F) cease at $t_4$, the voltage across both windings of the power transformer 5 become inverted and the switching transistor collector voltage $v_{C9}$ begins to rise substantially linearly, with a slope determined by the capitance of the shunt capacitor 10 and the indutance of the primary winding 4 of the power transformer 5. This linear rise will continue until the collector voltage reaches, at the instant $t_5$, a value $V_{PP}$ which approximately corresponds to the magnetron operating voltage $V_{AKO}$, i.e. $v_{C9}(t_4) = V_{PP} = V_{AKO} \cdot N_4/N_6$ (where $N_4$ is the number of primary turns and $N_6$ the number of secondary turns).

When the collector voltage $v_{C9}$ has passed the value of the power supply voltage $V_1$, between $t_4$ and $t_5$, the second rectifier diode 48 starts to conduct, as shown in diagram M, and charges the second filtering capacitor 48 to a voltage corresponding to approximately the peak-to-peak value of the voltage waveform across the terminals 7,8 of the secondary winding 6, which is about $V_{PP} \cdot N_6/N_4$, limited by the voltage regulating effect of the magnetron. When the magnetron operating voltage $V_{AKO}$ has been reached, at the instant $t_5$, the apparent load impedance decreases. The diode 48 will conduct a decreasing current until $t_8$ (diagram M) and the mean value of collector voltage $v_{C9}$ (diagram A) will remain approximately constant fron $t_5$ to $t_8$. When the diode current $i_{48}$ has ceased at $t_8$, the collector voltage $v_{C9}$ begins a resonant fall ($f_{res} = \frac{1}{2} L_4 \cdot C_{10}$) until it reaches a slighly negative value (equal to $-V_{FD}$), which turns the shunt diode 13 on, at the instant $t_9$. The shunt diode current $i_{13}$, shown in diagram K, has a negative peak at $t_9$ and gradually rises towards zero, which it reaches at $t_{10}$, whereafter the switching transistor 9 can be turned on with no collector voltage $v_{C9}$ (see A) across it. Thus the shunt diode 13 prevents the transistor 9 from being turned on during the normal, recurrent operation of the converter, with a high collector-to-emitter voltage. Actually, as shown by a dotted line added to the last pulse of the collector voltage $v_{C9}$ (diagram), a damped oscillation is superposed on it from $t_{14}$ to $t_{17}$, which is due to the oscillation of the primary winding leakage inductance with capacitor 10.

Before the switching transistor collector voltage $v_{C9}$ has reached the voltage $V_{55}$ supplied by the L.V. supply 57, the clamping diode 65 is cut off and the base voltage $V_{B66}$ of the second transistor 66(PNP) will be allowed to fall together with the collector voltage $v_{C9}$, so that at the instant $t_9$, this transistor 66 is turned on again and its collector voltage $v_{C66}$ will rise approximately to $V_{55}$, as shown in diagrams B and C. This will control the turn-off of the fourth transistor 74 (PNP), as described before and shown in diagrams D and E, respectively showing the base $v_{B74}$ and collector $v_{C74}$ voltage waveforms thereof. Thus the control MOSFET 39 is turned off at $t_9$ allowing the switching transistor base voltage $v_{B9}$ (diagram H) to rise from $-V_{Z41}$ to $+V_{FD}$ (approximately 0.7 volts).

As from $t_9$ to $t_{10}$ no switching transistor collector current $i_{C9}$ flows, the current transformer secondary winding 16 supplies only the inductive current due to the magnetic energy stored in transformer 12. When at $t_{10}$ the shunt diode current $i_{13}$ (diagram K) has ceased, an initial collector current $i_{C9}$ will flow through the primary winding 11 of the current transformer 12 into the colector, and through its secondary winding 16 towards the separator diode 31. However, the capacitor 18 shunting this winding has first to be charged to a voltage equal at least to the sum of the forward voltage drop $V_{FD31}$ across diode 31, the reverse breakdown voltage $V_{Z41}$ of the Zener diode 41 and the forward voltage drop $V_{FD}$ of the base-emitter junction of the switching transistor 9, before any base drive current can be supplied. If the capitance $C_{18}$ is large, the time to charge it causes a delay between the cancelling of the shunt diode current $i_{13}$ (see K) and the saturation of the switching transistor 9. This delay may cause the appearance of a short pulse or "blip" in the switching transistor collector voltage waveform $v_{C9}$ before it becomes saturated, which means an unnecessary increase of its switching losses. This blip can be eliminated by a judicious choice of the capacitance $C_{18}$. The presence of the separator diode 31 inthe base-drive circuit of FIG. 1 allows a great freedom of choice of the secondary winding inductance $L_{16}$ and of its shunt capacitance $C_{18}$, which can both be chosen small enough to provide a magnetizing current of sufficient peak amplitude for recharging both the shunt capacitor 18 and that 41 of the reverse-bias voltage source 40 before the shunt recovery diode current $i_{13}$ (diagram) has ceased to flow, so as to avoid the delay between the turn-off of the diode 13 and the turn-on of the switching transistor 9.

It is to be remarked here, that at $t_9$, when the shunt diode 13 starts to condcut, the H.V. supply voltage $V_1$ is applied across the terminals of the power transformer primary winding 4, thus inducing across the terminals 7,8 of its secondary winding 6 a voltage $V_{78}$ approximately equal to $-V_1 \cdot N_6/N_4$, which causes the first rectifier diode 47 to be turned on. The sine shape of the diode current $i_{47}$ from $t_9$ to $t_{11}$, is shown in diagram L of FIG. 4.

The circuit of FIG. 1 is thus a combined forward-flyblack switched-mode power supply, because the first rectifier diode 47 conducts during the on time of the switching transistor 9 and the second one 48 during its off time. After the turn-off of the first rectifier diode 47 (at $t_2$ and $t_{11}$ respectively), the collector current continues to flow in a linearly increasing manner, because the power transformer primary winding 4 has then become an almost purely inductive load. If the resistance $R_{75}$ of the variable resistor 75 has been increased, the on time of the switching transistor 9 has also been increased and so has the peak value of its collector current $I_{C9MAX}$ as well as the stored energy $LI_{C9MAX}/2$. This stored energy is transferred during its off (or flyback) time, through the power transformer secondary winding 6, the first capacitor 46 and the second rectifier diode 48, to the second filtering capacitor 49 and to the magnetron (not shown), whose anode is connected to the positive output terminal 50 and whose cathode is connected to the negative one 51. The current $I_{48}$ (diagram M) flows simultaneously into the second capacitor 49 and into the load connected in parallel thereto, across the terminals 50 and 51.

If the on time (from $t_1$ to $t_4$) is made longer by an increase of the resistance $R_{75}$ of the RC differentiating circuit, the linearly rising portions of the power transformer primary current $i_4$ (diagram F), of the power transistor collector current $i_{C9}$ (diagram G) and of the current transformer secondary current $i_{16}$ (diagram J of FIG. 2), i.e. the duration of the time interval from $t_2$ to $t_4$ will also be lengthened and the peak currents into the collector and into the base will be increased. While the current trasformer secondary current $i_{16}$ flows through the separator diode 31 into the base of switching transistor 9, from $t_1$ to $t_3$, or into the channel of the control MOSFET 39, during the storage time from $t_3$ to $t_4$, it will also flow through measuring resistor 17 in series with this winding 16 and will cause thereacross a voltage drop proportinal to the base drive and, consequently, to the collector current of the switching transistor 9. This voltage drop $R_{17} \cdot I_{16}$ will become increasingly negative relatively to ground, from $t_2$ to $t_4$. A predetermined fraction thereof is applied through a resistive voltage divider made up from the series-connected eleventh 78 and twelfth 79 resistors, to forward bias the emitter of the fifth transistor 77 (PNP), whose base is grounded. The increasing negative emitter-to-base bias of this NPN transistor 77 causes an increase in its collector current drawn from junction 72 between the series-connected collector load resistors 67 and 68 of the second transistor 66 (PNP).

The collector current through the fifth transistor 77, which is connected in parallel to the sixth resistor 68, will cause an increase in the collector current of the second transistor 66 and consequently an increase in the voltage drop across the fifth resistor 67. This will result in a decrease of the voltage at the junction 72, which is transmitted through coupling capacitor 73 to the base of the fourth transistor 74 and will cause its return to conduction prior to the instant $t_3$ determined by the sole time constant $T_c = R_{75} \cdot C_{73}$. Thus, the circuit composed of resistors 17, 79, 78, 67 and 68 and of transistor 77, provides a limitation of the peak collector current of the switching transistor 9. The choice of the values of the resistors 78 and 79 of the voltage divider biasing the emitter of transistor 77 allows to adapt the admitted peak collector current $I_{C9MAX}$ to the rating of the chosen type of switching transistor 9.

As has been mentioned before, during the initial starting period of the converter, the switching transistor collector current $i_{C9}$ rises above its rated peak value during the conduction time of the forward diode 47 and several recurrent conduction periods thereof are needed before the first capacitor 46 reaches the desired voltage. The current-limiting device 17 and 77–79 will also become operational and initiate the turn-off of the switching transistor 9 is such an increase in the charging current of capacitor 46 occurs during normal operation. During this starting period, the energy stored in the current transformer 12 might be insufficient to forward bias the switching transistor 9 and it might be advantageous therefore to keep biasing transistor 80 turned on by lengthening the starting pulse applied to input 61, whose trailing edge could be triggered, for example, by the appearance of the negative current pulses $i_{13}$ (diagram K) or when those of the secondary winding current $i_{16}$ or when the negative voltage pulses $v_{16}$ (respectively of diagrams I and J) fall below a predetermined negative threshold, or by the disappearance of the excessive switching transistor collector and base drive current amplitudes while capacitor 46 is being charged, which can also be measured across resistor 17.

When the duration of the on time of transistor 9 (from $t_o$ to $t_3$) is decreased by diminishing the resistance $R_{75}$ of variable resistor 75, its duty cycle, the magnetron input power $P_I$ as well as its output power $P_o$ are decreased. By further decreasing this on time, the output current of the peak-to-peak rectifier 45, as well as the off time of the switching transistor 9 decrease. When the peak-to-peak rectifier output voltage falls below the starting voltage $V_{AKS}$ of the magnetron, the latter ceases to draw current and to operate, and the rectifier becomes unloaded. With no load across its output terminals 50 and 51, the off time of the switching transistor 9 ($t_4$ to $t_9$) will become reduced to an interval whose duration is mainly determined by the resonance between the inductance $L_4$ of the power transformer primary winding 4 and the capacitance $C_{10}$ of the shunt capacitor 10 connected in series between the terminals 1 and 2 of the H.V. supply 3. Thus the minimum off time during standby operation of the converter of FIG. 1 will be approximately $2(t_9-t_8)$. The highest values of the current transformer secondary inductance $L_{16}$ and of the tuning capacitor 18 shunting it, have thus to be chosen in such a manner as to allow the repeated the turn-on of the switching transistor 9 after the minimum turn-off time. This provides the possibility of controlling the power output of the magnetron supplied to an oven by varying is duty cycle, without turning off the converter completely. One way of obtaining such a duty cycle adjusement is by intermittent variation of the duration of the quasistable state of the monostable multivibrator 66–69, 73–76 by replacing the manually adjustable variable resistor 75 by a voltage controlled resistor (BJT or FET), whose control input would receive a variable duty cycle rectangular voltage waveform from another monostable multivibrator.

It is also to be noted here, that the base drive circuit of FIG. 1 can be used as well in a flyback-type converter or in a converter whose secondary circuit includes a voltage multiplier made up from a plurality of cascaded peak-to-peak rectifiers (as described in the articles of the US review ELECTRONICS DESIGN, No. 19 of Sept. 13, 1974, pp. 158-163 and No. 7 of Mar. 29, 1978, pp. 72-74, for example).

The D.C. to D.C. converter or switch-mode power supply according to the invention allows:

(a) the control of the repetition frequency of its operation as well as the output power by adjusting the conduction time of its switching transistor 9 ;

(b) the limitation of the peak collector current of the switching transistor 9 by means of the resistor 17 and the transistor 77 ; and (c) the turn-on the transistor 9 after its collector-to-emitter voltage has fallen to a low voltage (of about $V_{55}$), by means of the shunt diode 13 and of the retriggering resistor 64 connected between its collector and the control circuit retriggering input (62 of FIG. 1).

It is moreover to be remarked here, as can be observed respectively from diagrams A and M of FIG. 2, that the durations (from $t_5$ to $t_8$ or from $t_{14}$ to $t_{17}$) of the switching transistor peak collector voltage $V_{PP}$ and of the swtiching transistor 9, vary as a function of the on time of the latter, when the output voltage of the peak-the-peak rectifier 45 has grown above the starting or operating threshold value of the magnetron anode-to-cathode voltage Below this threshold value, the variation of the on time of the transistor 9 causes mainly variations of its peak collector voltage and consequently of the output voltage of the rectifier 45. This will also be the case if the magnetron is replaced by a load of resistive nature, such as a cathode ray tube for example, where feedback voltage regulation by automatic duty cycle variation might be necessary.

I claim:

1. D.C. to D.C. converter with a switch-mode power supply including a switching transistor (9) having its collector-to-emitter path connected in series with the respective primary windings (11,4) of a current (12) and a power transformer (5), across the terminals (1,2) of a first D.C. power supply (3), a commutating capacitor (10) connected between the emitter of said transistor (9) and the junction of said primary windings (4,11), a base-drive circuit including the secondary winding (16) of said current transformer (12) and coupled to the base of said transistor (9) and a tuning capacitor (18) shunting said current transformer secondary winding (16) for forming with the inductance thereof a parallel resonant or oscillating circuit, characterized in that said secondary winding and said tuning capacitor have impedances selected for causing the resonant half-period of said parallel resonant or oscillating circuit (16, 18) to be shorter than that of the power transformer (5) primary winding (4) inductance with the capacitance of the commutating capacitor (10).

2. A converter as claimed in claim 1, wherein a separator diode (31) is inserted between the first terminal of said current transformer secondary winding (16) and the base of said switching transistor (9), said separator diode (31) conducting in the same direction as the base-emitter junction of the latter.

3. A converter as claimed in claim 2, wherein an unidirectionally conducting electronic control switch (39) is provided having an input or control electrode and two output electrodes respectively coupled to the base and the emitter of said switching transistor (9).

4. A converter as claimed in claim 3, wherein a voltage-source (40) for reverse-biasing the base of said switching transistor (9) is inserted between this base and the junction of said separator diode (39) and of said electronic switch (39) and wherein means for forward biasing said base at least during the starting period of said converter are also provided.

5. A converter as claimed in claim 1, wherein an unidirectionally conducting electronic control switch (39) is provided having an input or control electrode and two output electrodes respectively coupled to the base and the emitter of said switching transistor (9).

6. A converter as claimed in claim 5, wherein a voltage-source (40) for reverse-biasing the base of said switching transistor (9) is inserted between this base and the junction of said separator diode (39) and of said electronic switch (39) and wherein means for forward biasing said base at least during the starting period of said converter are also provided.

7. A converter as claimed in claim 5, wherein said electronic switch (39) is a metal-oxide-semiconductor field-effect switching transistor of the normally off, N-channel and enhancement-mode type, controlled by a rectangular gate-voltage waveform for keeping it turned on while the switching transistor (9) remains cut off.

8. A converter as claimed in claim 7, further comprising a control circuit (60) including a monostable multivibrator (66–69, 73–76) having a triggering input (62), variable time-constant coupling circuit (73, 75) determining the duration of its quasistable state and an output (52) coupled to the gate of said control MOSFET (39) to keep it turned on during its stable state.

9. A converter as claimed in claim 8, wherein the control circuit (60) further comprises a starting stage (71, 70) coupled to the triggering input (62) of said monostable multivibrator (66–69, 73–76) for triggering it into its quasistable state in response to an externally generated starting pulse applied to its input (61), when both said converter and control circuit are under voltage but not operating.

10. A converter as claimed in claim 8, wherein said control circuit (60) is supplied from a second D.C. power supply (57) and wherein it further comprises a further electronic switch (80) controlled by means of the starting stage (70, 71), for applying to the base of the switching transistor (9) a forward bias through a biasing resistor (140) for the duration of the starting pulse.

11. A converter as claimed in claim 8, wherein the triggering input (62) of said monostable multivibrator (66–69, 73–76) is furthercoupled (64) to the collector of said switching transistor (9) for keeping it in its stable state, when said collector is at a high positive voltage and for triggering it into its quasistable state, when the collector voltage falls below a predetermined positive threshold voltage.

12. A converter as claimed in claim 8, wherein a measuring resistor (17) is inserted between the second terminal of said current transformer secondary winding (16) and the emitter of said switching transistor (9), for providing a voltage drop substantially proportional to the collector current of the latter, while it is turned on and said control circuit (60) further comprises a current limiting stage (77–79) having an input (63) coupled to the junction of said measuring resistor (17) and said second terminal of said current transformer secondary winding (16) and an output coupled to the input (72) of said coupling circuit (73, 75), for applying thereto a negative-going voltage transition controlling the return of the monostable multivibrator (66–69, 73–76) into its stable state, when the base-drive and consequently the collector current of the switching transistor (9) exceeds a predetermined threshold value.

13. A converter as claimed in claim 7, wherein the secondary winding (6) of the power transformer (5) has its terminals (7, 8) connected to a rectifier assembly.

14. A converter as claimed in claim 13, wherein said rectifier assembly includes a diode and a capacitor connected in series, said diode conducting during the off time of said switching transistor (9).

15. A converter as claimed in claim 13, wherein said rectifier assembly is a peak-to-peak rectifier (45) including two diodes (47, 48) and two capacitors (46, 49), one of said diodes (47) conducting during the respective on times of said shunt recovery diode (13) and of said switching transistor (9), while the other (48) conducts during their off times.

16. A converter as claimed in claim 13, wherein the load connected across the output terminals of said rectifier assembly is a continuous-wave magnetron.

17. A converter as claimed in claim 16, wherein, when the rectifier assembly output voltage controlled by the duration of the quasistable state of said monostable multivibrator (66–69, 73–76) has become higher than the starting threshold voltage of said magnetron, further increase in the duration of the quasistable state provides mainly an increase of the rectifier output power without substantial variations of its output voltage, as well as an increase of the durations of the off tune of said switching transistor (9).

18. A converter as claimed in any claim 1, wherein a measuring resistor (17) is inserted between the second terminal of said current transformer secondary winding (16) and the emitter of said switching transistor (9), for providing a voltage drop substantially proportional to the collector current of the latter, while it is turned on.

* * * * *